United States Patent
Liu et al.

(10) Patent No.: US 11,113,785 B2
(45) Date of Patent: Sep. 7, 2021

(54) MITIGATING LATENCY-BASED DISPLAY DELAYS

(71) Applicant: International Business Machines Corporation, Armonk, NY (US)

(72) Inventors: Su Liu, Austin, TX (US); Inseok Hwang, Austin, TX (US); Jinho Lee, Travis, TX (US); Matthew Harrison Tong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/679,573

(22) Filed: Nov. 11, 2019

(65) Prior Publication Data

US 2021/0142439 A1    May 13, 2021

(51) Int. Cl.
   *G06T 1/60*    (2006.01)
   *G06F 3/01*    (2006.01)

(52) U.S. Cl.
   CPC ............. *G06T 1/60* (2013.01); *G06F 3/011* (2013.01)

(58) Field of Classification Search
   CPC .................................. G06T 1/60; G06F 3/011
   USPC ................................................ 345/522, 633
   See application file for complete search history.

(56) References Cited

U.S. PATENT DOCUMENTS

| 9,240,069 | B1 | 1/2016 | Li |
| 10,083,538 | B2 | 9/2018 | Li |
| 10,089,790 | B2 | 10/2018 | Lawson et al. |
| 2012/0140070 | A1* | 6/2012 | De Mers .............. G02B 27/017 348/144 |
| 2018/0261003 | A1* | 9/2018 | Peli ........................ G06T 15/08 |
| 2019/0012832 | A1 | 1/2019 | Sun et al. |
| 2020/0120322 | A1* | 4/2020 | Ogasawara .......... H04N 13/122 |

FOREIGN PATENT DOCUMENTS

CN        106504334 A     3/2017

OTHER PUBLICATIONS

Westhoven et al., "Head Turn Scaling Below the Threshold of Perception in Immersive Virtual Environments," Proceedings of the 22nd ACM Conference on Virtual Reality Software and Technology, Dated Nov. 2-4, 2016, 10 pages, ISBN: 978-1-4503-4491-3/16/11, DOI: http://dx.doi.org/10.1145/2993369.2993385.

Steinicke et al., "Hybrid Traveling in Fully-Immersive Large-Scale Geographic Environments," Proceedings of the 2007 ACM Symposium on Virtual Reality Software and Technology, 2007, 2 pages, © 2007 ACM 978-1-59593-863-3/07/0011.

(Continued)

*Primary Examiner* — Jennifer Mehmood
*Assistant Examiner* — Kim Thanh T Tran
(74) *Attorney, Agent, or Firm* — Peter J. Edwards

(57) ABSTRACT

A movement notification is received from a display. The movement notification corresponds to a movement. A set of movement frames that reflect the movement is rendered by a graphical processing unit. The set of movement frames is transmitted to the display. A notification that the movement has ceased is received from the display. A stop command is transmitted to the display. The stop command instructs the display to not display the first subset of frames in the set of movement frames. The first subset of frames reflects the end of the movement.

20 Claims, 8 Drawing Sheets

(56) References Cited

OTHER PUBLICATIONS

Steinicke et al., "Estimation of Detection Thresholds for Redirected Walking Techniques," IEEE Transactions on Visualization and Computer Graphics, vol. 16, No. 1, 2010, 10 pages.
Regan et al., "Priority Rendering with a Virtual Reality Address Recalculation Pipeline.," Proceedings of the 21st Annual Conference on Computer Graphics and Interactive Techniques, ACM, 1994, 9 pages.
Olano et al., "Combatting Rendering Latency," Proceedings of the 1995 Symposium on Interactive 3D Graphics, ACM, 1995, 7 pages.
Azmandian et al., "Haptic Retargeting: Dynamic Repurposing of Passive Haptics for Enhanced Virtual Reality Experiences," ACM SIGCHI Conference on Human Factors in Computing Systems, 2016, 12 pages.
Mell et al., "The NIST Definition of Cloud Computing," Recommendations of the National Institute of Standards and Technology, U.S. Department of Commerce, Special Publication 800-145, Sep. 2011, 7 pages.
Borst et al., "Adaptation without parameter change: Dynamic gain control in motion detection," PNAS, 2005, 5 pages.

\* cited by examiner

MITIGATING LATENCY-BASED DISPLAY DELAYS

BACKGROUND

The present disclosure relates to graphics processing, and more specifically, to graphics processing for remote displays.

Real-time graphics processing can be a resource intensive activity. Contemporary use cases such as video-game environments and virtual-reality environments, for example, often contain high-texture graphics. Further, in many such use cases, maintaining a high framerate may be required in order achieve a positive user experience. However, maintaining a sufficiently high framerate in many use cases typically requires powerful modern graphics processing units (also referred to herein as "graphics processor units" and "GPUs") that are sometimes large, bulky, expensive, and difficult to cool properly.

SUMMARY

Some embodiments of the present disclosure can also be illustrated as a method comprising receiving a movement notification from a display. The movement notification may correspond to a movement. The method may also comprise rendering, by a graphical processing unit, a set of movement frames that reflect the movement. The method may also comprise transmitting the set of movement frames to the display. The method may also comprise receiving a notification that the movement has ceased from the display. Finally, the method may comprise transmitting a stop command to the display. The stop command may instruct the display to not display a first subset of frames in the set of movement frames. The first subset of frames may reflect the end of the movement.

Some embodiments of the present disclosure can also be illustrated as a system comprising a processor and a memory in communication with the processor. The memory may contain program instructions that, when executed by the processor, are configured to cause the processor to perform the above method.

Some embodiments of the present disclosure can also be illustrated as a method comprising detecting a movement command. The movement command may correspond to a movement. The method may also comprise transmitting the movement command to a server. The method may also comprise receiving, from the server, a first set of movement frames that reflect a first portion of the movement. The method may also comprise receiving, from the server, a stop command. The method may also comprise receiving, from the server, a second set of movement frames that reflect a second portion of the movement. The method may also comprise displaying the first set of movement frames. The method may also comprise redisplaying a frame from the first set of movement frames after displaying the first set of movement frames. The method may also comprise discarding without displaying, the second set of movement frames based on the stop command.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
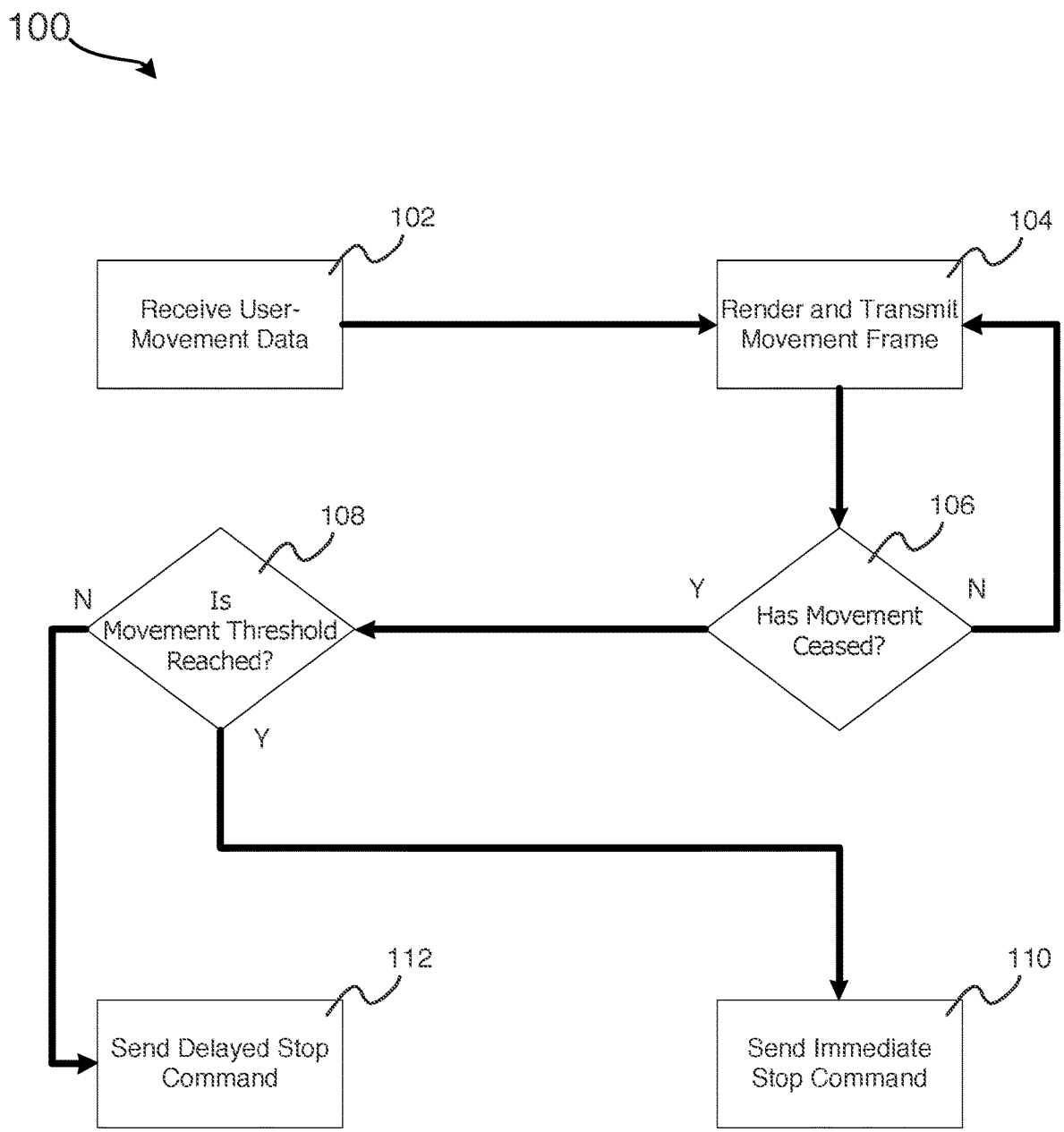
FIG. 1 depicts an example method of sending a stop command to a user display in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to graphics processing, and more specifically, to graphics processing for remote displays. While the present disclosure is not necessarily limited to such applications, various aspects of the disclosure may be appreciated through a discussion of various examples using this context.

Contemporary interactive video content sometimes involves user movements in highly detailed environments. These movements are represented on video displays (e.g., televisions, computer monitors, virtual-reality-headset displays, augmented-reality-headset displays) in terms of series of rendered frames. Rendering any particular frame, let alone a set of frames that reflect a movement, can require significant computing resources. For example, some such environments can contain very high-definition textures applied to many objects in the environment. Determining which portions of which textures need to be displayed, the angles at which to display those portions of textures, and the lighting of the environment in which to display those textures may involve a significant amount of calculations. In some use cases, expensive graphics-processing hardware is necessary in order to render and display the frames of the video content quickly enough for an acceptable user experience.

This difficulty may be exacerbated in some virtual-reality environments. In some virtual-reality environments, a user wears a virtual-reality headset (sometimes referred to herein as a "VR headset") that monitors a user's physical movements (e.g., head rotations, crouching and jumping) and displays the frames that reflect those movements in a display mounted on the headset. Because any movement of the user's head can change the image that is to be displayed, the number of movements that require frame updates (and thus rendering calculations) over a given time period may be greater in virtual reality environments (sometimes referred to herein as "VR environments) than in standard environments.

Further, some virtual-reality environments have high resolution and framerate requirements in order to maintain enjoyable user experiences. For example, low-resolution frames may lead to video that is believable or enjoyable in a virtual-reality environment. Further, virtual-reality video that is not delivered at a high framerate (i.e., the rate at which images of the VR environment can be displayed on the VR headset), is not delivered at a steady framerate, or that is significantly delayed with respect to user movements may cause motion sickness in the user.

However, the ability to reliably render the high-resolution frames at a high framerate to keep up with typical movement commands in a VR environment may require one or more high-performance graphical-processing units (sometimes referred to herein as "GPUs). These high-performance GPUs may be large, heavy, bulky, expensive, and difficult to keep cool in operation. Thus, even when users of VR headsets are able to afford GPUs that are sufficiently powerful to produce an enjoyable user experience, attaching the GPU to the VR headset typically results in a headset that is too large, heavy, and hot to be enjoyable to use.

While it is possible, in some cases, to store a GPU in a nearby computer rather than in the VR headset. In typical such examples, the GPU is stored in a desktop-style computer in the same room as the VR headset. While it may also possible to store the GPU in a laptop-style computer, the size and cooling restrictions of laptop-style computers often make it impractical to operate a GPU that is powerful enough to provide a seamless user experience in a VR environment. For this reason, solutions can significantly limit the mobility of the user. For example, moving the operation of a VR headset from one room to a next room may require moving the desktop-style computer to the next room. In most cases this is likely to be inconvenient, but in some cases it may be completely impractical. Further, moving the operation of a VR headset to a different premises (e.g., to a different house) may also require moving the desktop-style computer to the different premises, which may be even more inconvenient and less practical.

Finally, even where mobility considerations are not a concern, storing the GPU in a nearby computer may still be impractical due to cost considerations. GPUs that are powerful enough to provide a seamless user experience in virtual reality (sometimes referred to herein as "VR") can cost many hundreds or even thousands of dollars. Thus, even where bulk, weight, mobility, and cooling are not a concern, high-power GPUs may be impractical for the average user. For these reasons, a solution that allows a user of a VR headset to benefit from the rendering capabilities of high-power GPUs while avoiding these disadvantages is desired.

In some instances, it may be possible to utilize one or more GPUs operated in one or more remote server computers (for example, in "the cloud") to meet the frame-rendering requirements of most VR use cases. Utilizing cloud computing, for example, many GPUs can be assigned to provide frame-rendering support to remove users of VR headsets. In these use cases, the VR headsets may be limited to a display, motion-tracking capabilities, and network-communication capabilities (e.g., a Wi-Fi card and antenna, Ethernet port, Bluetooth protocol, or cellular card and antenna). The VR headset may connect to the cloud-hosted computer through the Internet, either directly or through another computer (e.g., a nearby laptop). The VR headset may then send information, such as movement data and data describing the VR environment, to the cloud-hosted computer. The cloud hosted computer may then render one or more display frames based on that information and transmit those display frames to the VR headset to be displayed to the user of the headset.

For example, a user of a VR headset may be using the VR headset to remotely participate in a class, meeting, or lecture hosted in a VR environment. If that user turns his or her head from the left to the right (e.g., to view a speaker in the VR environment), the VR headset may monitor the movement information associated with the movement and transmit the movement information to the cloud-hosted computer. The cloud-hosted computer may then render a set of display frames for the movement (sometimes referred to herein as "movement frames") and transmit those display frames to the VR display. In typical clouds-hosted computer environments, the same computer resources can serve several users over an extended period of time, enabling the expense of purchasing and operating high-power GPUs to be spread over those several users. This may also make utilizing cloud-based GPUs quite economical.

Thus, cloud-hosting computers with high-power GPUs (referred to herein as cloud-hosted GPU resources) may be capable of rendering display frames for VR environments in a resolution and a framerate that are high enough to provide a satisfying user experience. Further, cloud-hosted GPU resources may be affordable and enable low-weight, high-mobility headsets.

However, utilizing typical cloud-hosted GPU resources may introduce a different disadvantage-latency. While cloud-hosted GPU resources may be capable of quickly rendering frames (i.e., at high framerates) for remote users, packaging and transmitting those frames over typical communication channels can introduce a significant latency. In other words, there is often a noticeable gap between the time at which a user of a VR device begins a movement (e.g., rotating his or her head) and the time at which the movement is reflected by frames displayed on the VR display. This latency also causes a delay between the time at which the user of the VR device ends the movement (e.g., stops rotating his or her head) and the time at which that movement finishes being displayed on the VR device.

These delays can cause significant discomfort on the part of the typical VR user. The delay after a movement is finished, for example, may be likely to cause motion sickness in the typical user because the user's brain reacts poorly to an image of a moving field of view when the user is not moving. For this reason, a cloud-based GPU solution that is capable of rendering display frames for remote users of VR devices, while mitigating latency-based delays at the end of user movements, is desired.

Some embodiments of the present disclosure attempt to mitigate latency-based delays associated with cloud-based GPU solutions for VR environments by issuing a command to the VR device to stop rendering a user movement before all frames of that movement have been rendered. For example, if the user of a VR device turns his or her head 50° between a first time (e.g., 0.0 seconds) and a second time (e.g., 2.0 seconds), transmission latency may typically cause the VR device to display that movement between 0.5 and 2.5 seconds rather than 0.0 and 2.0 seconds. However, because the user stops moving at 2.5 seconds, the last 25% of the displayed movement (i.e., the movement occurring after 2.0 seconds) may be likely to cause motion sickness.

Therefore, some embodiments of the present disclosure may involve a cloud-based computer (also referred to herein as a "server") sending a command (or, in some embodiments, a request) to the VR display to stop the motion early by replacing the last movement frames with still frames (i.e., frames that, when combined together in sequence, do not give the impression of user motion). Continuing the previous example, the server that is hosting the cloud-based GPU may receive a notification from the VR device as 2.01 seconds that the VR device has stopped moving. The GPU may respond by immediately sending a command to the VR device to redisplay the most previously displayed frame, which may occur at 2.02. The VR device, upon receiving this command, may display still frames between 2.02 and 2.5, rather than movement frames. From the user's perspective, the delay between 2.0 (at which point the user stopped moving) and 2.02 (at which point may the VR display reflected that movement) may not be noticeable, and thus it may appear to the user that the user simply did not move as far as he/she intended.

However, in many instances a user my not be able to notice a displayed movement that is shorter than an actual movement. For example, a user may not realize that an actual movement of 90° is not accurately reflected by a displayed rotation of 76.5° (i.e., 85% of the actual movement). Thus, in some instances the movements of a user may be cut short when being displayed, which may create benefits (e.g., reducing motion sickness) without introducing other negative effects. However, some users may be more sensitive to movements being cut short on a VR display. For example, while some users may typically not notice movements that are cut short by as much as 40%, some users may begin to notice movements being cut short when 12% is truncated. Further, some users may be more sensitive to movements being truncated in some environments than in others. For example, some users may notice movements that are truncated by as low as 10% in a lecture, but may not notice movements that are truncated by as much as 25% in an active videogame. Further, some users may be more sensitive to certain types of movements than to other movements (e.g., rotation movements rather than translation movements, movements combining rotation and translation rather that isolated rotation or isolated translation, fast movements vs slow movements, etc.).

For these reasons, some embodiments of the present disclosure also include a movement threshold. This movement threshold may govern the lowest percentage of an actual movement that must be completed before the displayed movement may be truncated. For example, if the movement threshold is 20%, a display of an actual 45° head rotation could not be truncated until the movement were at least 80% completed (35°). In some embodiments, these movement thresholds may be customized to a particular user and particular environments.

FIG. 1 depicts an example method 100 of rendering display frames at a remote server and truncating a user movement based on a movement threshold. Method 100 may be performed by a computer system, such as a server that operates in a cloud environment. The computer system (sometimes referred to herein as the "rendering system") may have one or more graphics processor units (GPUs) that are capable of rendering high-detail display frames (e.g., still frames, movement frames) at a high rate (i.e., a high framerate) for one or more remote user systems (e.g., a virtual reality display). Method 100 may be performed during a user session during which the user's personal computer or display device is connected with the rendering system over the internet, for example. In this user session, the rendering system may be exchanging information with the user's personal computer or display device. The user's display device may, therefore, be sending the rendering system information about the user's use of the display device or the user's personal computer.

In some embodiments, the rendering system performing method 100 may be locally running all (or most) applications that the user is interacting with (for example, using the user's local display and peripheral hardware). For example, the user may be wearing a VR device that tracks the user's inputs, sends input data to the rendering system, and displays the frames rendered by the rendering system to the user. However, some (or all) software with which the user is interacting (e.g., a virtual-reality meeting room program, a video game) may be operating on the rendering system performing method 100. In these embodiments, the user system (e.g., the user's display(s), mouse and keyboard, and personal computer) may periodically (e.g., 300 times per second, 1000 times per second) transmit the user's input data to the rendering system performing method 100. In other embodiments, on the other hand, the user's personal computer may be running much or all of the program with which the user is interacting (for example, a 3 dimensional computer-animated-design program that requires data stored on the user's personal computer), but the user's personal computer may be offloading the frame-rendering tasks to the rendering system operating method 100.

Method 100 begins when the rendering system receives data that reflects a user movement in block 102. This data may provide the rendering system with the information that is necessary for the rendering system to render a set of display frames that reflect the movement (sometimes referred to herein as "movement frames"). In embodiments in which the program with which the user is interacting is being run by the rendering system, the user-movement data may be largely limited to data about the actual user input. The movement reflected by the user-movement data may be, for example, the beginning of a rotation movement that is input by a user through a peripheral device (e.g., a computer mouse, a game controller, a keyboard, and a VR device, external movement sensors, video cameras and others). In some instances, for example, the movement may be a user who is wearing a VR headset rotating his or her head to look around in the virtual environment. The user-movement data, then, may include the starting point, angle of rotation, speed of rotation, direction of translation (e.g., shifting up or down, leaning left or right, moving forward or backward), and speed of translation.

In some embodiments, the user's personal computer (or another computer) may be operating some processes of the program with which the user is interacting, in which case the movement data may include more information. The movement data may also include information about the program. For example, if a user is logged into a massive multiplayer online game, the remote server that is running the game may send data pertaining to the game environment to the rendering system that is operating method 100. In some instances, the user's computer may run some processes of a program due to security or data-privacy concerns, but the user-movement data sent by the user's computer include information about the program's processes that are necessary for the rendering system to effectively render the movement frames for the user's device.

In block 104, the rendering system renders and transmits at least one display frame that reflects the user's movement command (referred to herein as the movement frame) to the user's display device. In block 104, transmitting the movement frame may also include packaging the frame to be sent over the Internet. Because the movement frame may be a high-definition image that contains a lot of data, transmitting (packaging and sending) the movement frame may take a large amount of time as compared to the amount of time required to transmit the user-movement data to the rendering system, or even to render the frame.

In block 106, the rendering system determines whether the movement has ceased. In typical embodiments, the rendering system may make this determination by analyzing the data received from the user system subsequent to the user-movement data received in block 102. For example, if the user is wearing a VR device, the original user-movement data received in block 102 may be because the user was in the process of rotating his or her head up. In block 106, the rendering system may then determine whether it is receiving data from the user's system to suggest that the user is continuing to rotate his or her head, or whether the user has stopped moving his or her head. If the user is still rotating his or her head (or, in some embodiments, performing another movement that would change the user's view, such as jumping or walking forward), the rendering system performing method 100 may be receiving user-movement data that is similar to the user-movement data received in block 102. However, if the user is no longer moving (e.g., rotating or translating his or her head, crouching, walking backwards), the rendering system may not be receiving user-movement data. For example, the rendering system may be receiving no user-input data or data that specifies "no movement commands." Alternatively, the rendering system may be receiving user-movement data, but the rendering system may, upon analyzing the data, determine that the movement has ceased.

If the rendering system determines in block 106 that the movement has not ceased, the rendering system returns to block 104 to render and transmit at least one new movement frame that reflects the new user-movement data. If, on the other hand, the rendering system determines that the movement has ceased, the rendering system proceeds to block 108.

At the time at which the rendering system reaches block 108, the rendering system is aware that the user is no longer inputting movement data and the rendering system has already rendered and begun transmitting all movement frames for the previous user movement. However, it is likely, as discussed earlier, that at least one transmitted movement frame has not completed transmission to the user (or, in some instances, even packaging for transmission). Thus, to avoid the undesirable effects associated with latency-delayed movements being displayed to the user after the user has stopped moving, the rendering system proceeds to prepare to send a stop command to the user system. That preparation includes determining, in block 108, whether a movement threshold has been reached. This determination may take several forms. For example, in some embodiments the user system may report to the rendering system the identification of each frame that the user system has already displayed. Thus, when the rendering system determines that the movement has ceased, it may also be able to determine how much of the movement that the user system has already displayed. In other embodiments, the rendering system may estimate how many of the rendered movement frames the rendering system has sent by determining the size of the frames and considering those sizes with the transmit timestamps for the frames and the connection speed between the user system and the rendering system.

As discussed previously, the movement threshold may be an expression of the extent to which a user is willing to tolerate (or, in some embodiments, is able to notice) the user's display (e.g., VR headset) truncating the user's movement. For example, some users may not want to notice any movement truncation, but may be unable to detect any truncation above 20% (i.e., the user may be unable to notice that a movement is truncated as long as least 80% of the movement is displayed on the user's display). However, some users may be able to detect truncation over 10%, but may be willing to tolerate truncation as long as 85% of the movement is displayed. Some users may be able to detect truncation of a purely translational movement that is over 10%, but may only be able to detect truncation of a rotational movement if it is above 15%, and only be able to detect truncation of a combination movement (i.e., a movement comprising both rotation and translation) if it is above 13%.

This movement threshold may be obtained based on several sources. In some embodiments, the rendering system may simply receive the movement threshold from the user system. In some embodiments, however, the rendering system may determine the movement threshold based on the user's data (e.g., preferences regarding avoiding latency and avoiding significantly truncated movements), crowd-sourced data (e.g., data on how much truncation the average user is able to detect or tolerate), the type of movement, the virtual environment (e.g., whether the user is playing a fast-paced videogame or attending a virtual lecture), and the user's equipment (e.g., whether the user is using a VR display or a standard display, the refresh rate of the user's display).

Thus, the rendering system may determine, in block 108, whether a movement threshold has been reached by comparing the portion of the movement that has already been displayed by the user display to the total movement. For example, if the movement threshold is 90% and the rendering system is notified that the user's VR display has displayed 85% then the rendering system would determine that the movement threshold has not been reached. However, if the movement threshold is 80% and the rendering system estimates that the user's display has displayed 87%, then the rendering system may determine that the movement threshold has been reached.

If the rendering system determines that the movement threshold has been reached, the rendering system may send an immediate stop command to the user system in block 110. The precise form of this stop command may vary, but the purpose of the command is to inform the user system that it should stop displaying movement frames in an effort to truncate the displayed user movement. For example, the rendering system may send a command to the user system to redisplay the frame that the user system is in the process of displaying. Even though that frame may be the middle of a movement, redisplaying it for several frames after it is displayed may give the impression that the movement has finished at that point. Thus, the apparent movement delay associated with latency may be reduced or eliminated.

If, on the other hand, the rendering system determines in block 108 that the movement threshold has not yet been reached, the rendering system may send a delayed stop command in block 112. Similar to the immediate stop command, the precise form of a delayed stop command may also vary, but the purpose of the command is to inform the user system that it should stop displaying movement frames once the movement threshold is reached. For example, if the rendering system is aware that the movement threshold will be reached after the user display displays the next three frames, a delayed stop command could take the form of an instruction to display the next three frames that are received by the server, then repeat the third frame. If, on the other hand, the rendering system is aware that the movement threshold would be met after a particular frame is displayed, but does not have information regarding which frames have already been displayed, the delayed stop command may take the form of an instruction to continue displaying movement frames until that particular frame is displayed, then to repeat that particular frame. In these embodiments, the particular frame may be referred to by an identifying number (e.g., a unique data tag that is applied to the frame) or by the particular frame's place in the sequence of frames (e.g., the $492^{nd}$ frame since starting the movement).

In some embodiments, the user's rendering system may be capable of calculating whether the movement threshold has been reached. In those embodiments, a delayed stop command may take the form of an instruction to continue to display movement frames until the movement threshold is reached, at which point to repeat the most-recently displayed movement frame.

In some embodiments, a stop command (either an immediate stop command or a delayed stop command) may include an instruction to not display any frames that are received subsequent to the command that pertain to the previous movement. For example, rendering system may have sent an immediate stop command while 10 frames were still in transit to the user system. Those 10 frames may be received by the user system, along with an instruction to display them, after the user system responds to the stop command. Without an instruction to ignore those 10 frames (either by explicit identification or a more general instruction), the user system may begin displaying the movement frames after responding to the stop command, resuming the latency-delayed movement display. This ignore instruction may, as previously discussed, identify the specific frames to ignore (e.g., by ID number, by referring to a list the next X frames, or by referring to any frames associated with the previous user movement).

In some embodiments of the present disclosure, a rendering system may not have information to determine a movement threshold, let alone whether the movement threshold has been reached. In these embodiments, the rendering system may be unable to accurately estimate whether the movement threshold has been reached in block 112. In some of these embodiments, the rendering system may estimate that the movement threshold has not been reached, and transmit a delayed stop command to the user system that gives the user system the information it needs in order to determine whether the movement threshold has been reached and when to stop displaying new movement frames. For example, the rendering system may provide the user system with the total number of frames that reflects the complete actual user movement. If the rendering system is not aware of a movement threshold having been set, it may recommend a movement threshold to the user system based on, for example, crowd-sourced data.

In some embodiments, however, the user system may be capable of determining a movement threshold without the input of the rendering system, and may also be capable of determining whether the movement threshold has been reached. Thus, in some embodiments, the user system may perform an analog of blocks 108 and may determine when precisely to enact a stop command from the user system.

Figure 2:
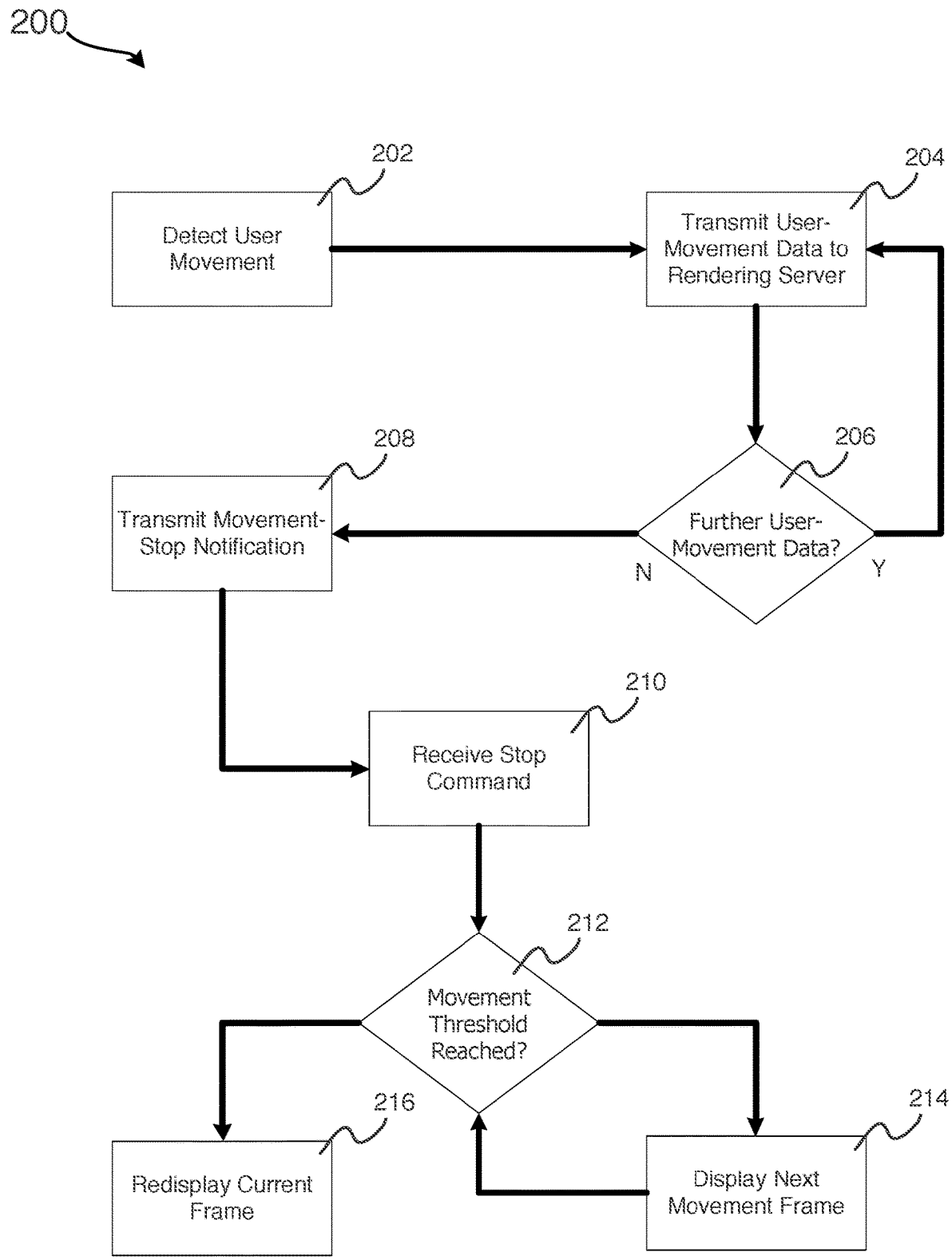
FIG. 2 depicts an example method of receiving a stop command from a remote server in accordance with embodiments of the present disclosure.

FIG. 2 illustrates an example method 200 in which a user system is aware of the user's movement threshold for a particular movement and is capable of determining whether the movement threshold has been reached when responding to a stop command. Method 200 begins in block 202 when the user system detects user movement. This may occur, for example, if a user system is a VR device and the user has begun crouching down, initiating a user movement. Upon detecting the user movement in block 202, the user system begins transmitting the user-movement data to a rendering server in block 204. The user-movement data may take various forms, but includes the data necessary for the rendering server to render movement frames reflecting the user movement. The user system then proceeds to determine, in block 206, whether all movement data has been transmitted to the rendering server, or if further movement data has been recorded. In other words, the user system determines if the user moved further after the user system transmitted the previous user-movement data in block 204.

If further user-movement data is identified in block 206, the user system transmits that further user-movement data in block 204. If, however, no further user-movement data is identified, a movement-stop notification is transmitted to the rendering server in block 208. In some embodiments, a movement-stop notification may take the form of an explicit notice that the user is no longer moving. However, in some embodiments the movement-stop notification may take the form of transmitting sensor data showing that the user is no longer entering movement commands (e.g., head tracking data showing that the user's head is still). Finally, in embodiments not disclosed by FIG. 2, the user system may, rather than sending a notification, simply stop sending the rendering system any movement data, from which the rendering system may determine that the user has stopped moving.

At the point at which the user system transmits the movement-stop notification in block 208, it is expected that the user system has already begun to receive display frames that reflect the user's movement from the rendering server, and may be displaying those frames to the user. However, in block 210, the user system receives, in response to the movement-stop notification, a stop command from the rendering server. Because the user system is capable of determining whether the movement threshold has been reached, the particular form of this stop command (e.g., immediate or delayed) may not be important to the user system. Rather, in response to receiving the stop command in block 210, the user system may proceed to determine whether the movement threshold has been reached in block 212.

The movement threshold referred to in block 212 may vary based on the circumstances. For example, in some embodiments the user may be capable of selecting a user threshold in the user-system settings. For example, the user may be capable of selecting "85%" as a movement threshold, indicating that the user accepts up to 15% of the user's movement being truncated to avoid latency-based movement delays. In some embodiments, the user may be able to select a general sensitivity to movement truncation, and the system may create a movement threshold based on that selection. In some embodiments, this selection may be relative to potential latency-based delays. For example, if a user states that the user is somewhat sensitive to movement truncation, but very sensitive to latency-based display delays, the system may establish a movement threshold of 10% in situations of high latency (e.g., significant time delays between transmitting movement data in block 204 and receiving corresponding rendered frames) but may establish a movement threshold of 20% in periods of low latency.

In some embodiments, the user system may determine, in block 212, that the movement threshold has been reached by analyzing the rendered frames received from the rendering server to determine the portion of the user movement that those frames reflect. In other embodiments, the user system may receive, from the rendering system, a list of all frames that the rendering system prepared to reflect the user movement. The user system may then calculate the number of those frames that the user system has already displayed and divide that by the total number of frames.

If the user system determines in block 212 that the movement threshold has not been reached, the user system displays the next received movement frame in block 214, after which the user system returns to block 212. If, however, the user system determines in block 212 that the movement threshold has been reached, the user system truncates the displayed movement by redisplaying the current movement frame in block 216. This may give the impression, to the user, that the movement is completed and that the display has displayed the entire movement. In these embodiments, the user system may continue to redisplay the current frame until the user inputs another movement command. In some embodiments, the user system may have received a list of rendered frames that reflect the detected user movement and the user system may identify the truncated frames and discard them when they are received from the rendering system.

For the sake of understanding, FIGS. 3A-3C, FIGS. 4A-4C, and FIGS. 5A-5C disclose abstractions of truncating user movements in accordance with the embodiments of the present disclosure. FIGS. 3A-3C, FIGS. 4A-4C, and FIGS. 5A-5C, depict a user wearing a virtual-reality headset that is performing rotation and translation movements. These movements may be tracked and the virtual-reality environment that is displayed to the user may be altered as a result.

Figure 3A:
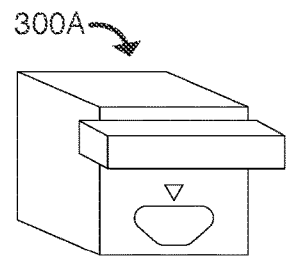
FIG. 3A depicts a user of a virtual-reality display before a rotational movement command, in accordance with embodiments of the present disclosure.
Figure 3B:
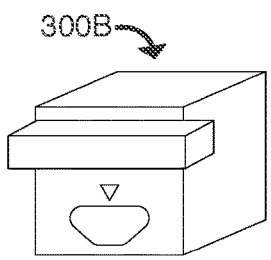
FIG. 3B depicts a user of a virtual-reality display after a rotational movement command, in accordance with embodiments of the present disclosure.
Figure 3C:
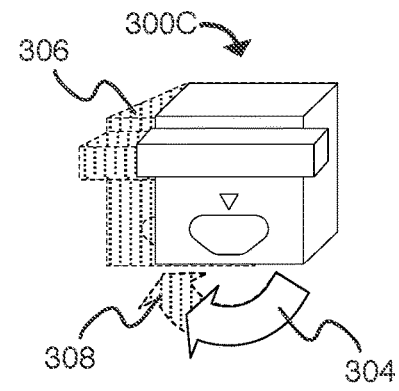
FIG. 3C depicts a displayed rotational movement that was reduced by a stop command in accordance with embodiments of the present disclosure.

For example, FIG. 3A-3C illustrate a user rotating his or her head horizontally (from the user's perspective, from left to right). FIG. 3A illustrates the starting point of user 300A. FIG. 3B illustrates the actual ending point of the actual head rotation for user 300B. This movement is represented by arrow 302. Finally, FIG. 3C illustrates the displayed ending point of the truncated head rotation for virtual user 300C. This truncated movement is represented by arrow 304. Thus, in order to avoid latency-based display delays, the portion of the motion 306 that is past what is shown by virtual user 300C would not be displayed by the user system. This portion is represented by arrow 308. Therefore, the frames displayed to the user would alter the virtual-reality environment according to movement represented by arrow 304, rather than the movement represented by arrows 302 or 308.

Figure 4A:
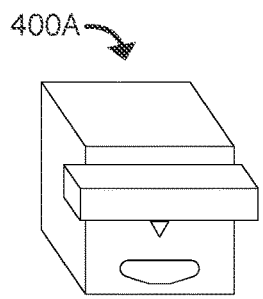
FIG. 4A depicts a user of a virtual-reality display before a rotational movement command, in accordance with the present disclosure.
Figure 4B:
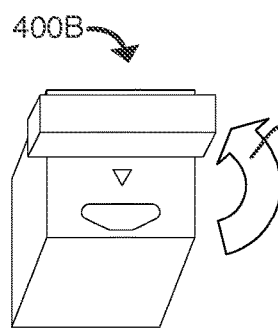
FIG. 4B depicts a user of a virtual-reality display after a rotational movement command, in accordance with embodiments of the present disclosure.
Figure 4C:
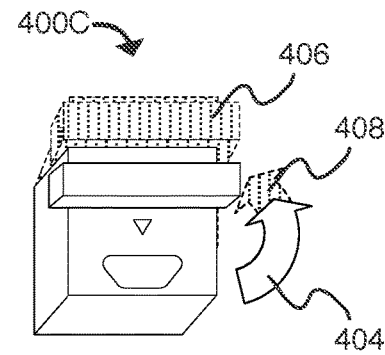
FIG. 4C depicts a displayed rotational movement that was reduced by a stop command in accordance with embodiments of the present disclosure.

Similar to FIG. 3A, FIG. 4A illustrates a user 400A who is at the starting point of a user motion (from the user's perspective, tilting/rotating the head from down to up). FIG. 4B illustrates the user 400B at the actual ending point of the movement. This actual movement is represented by arrow 402. FIG. 4C illustrates the displayed ending point of the truncated head motion for virtual user 400C. This truncated movement is represented by arrow 404. Thus, in order to avoid latency-based display delays, the portion of the motion 406 that is past what is shown by virtual user 400C would not be displayed by the user system. This portion is represented by arrow 402. Therefore, the frames displayed to the user would alter the virtual-reality environment according to the movement represented by arrow 404, rather than the movement represented by arrows 402 or 408.

Figure 5A:
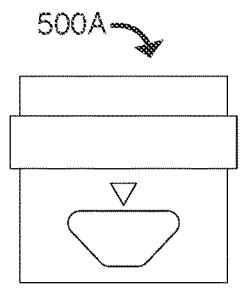
FIG. 5A depicts a user of a virtual-reality display before a translational movement command, in accordance with embodiments of the present disclosure.
Figure 5B:
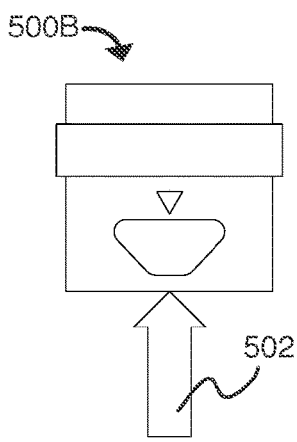
FIG. 5B depicts a user of a virtual-reality display after a translational movement command, in accordance with embodiments of the present disclosure.
Figure 5C:
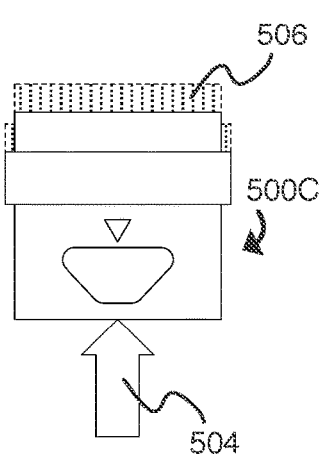
FIG. 5C depicts a displayed translational movement that was reduced by a stop command in accordance with embodiments of the present disclosure.

Similar to FIGS. 3A and 4A, FIG. 5A illustrates a user 500A who is at the starting point of a user motion (from the user's perspective, raising the user's head, or, in other words, translating the user's head upwards, as if moving from a crouching position to a standing position). FIG. 5B illustrates the user 500B at the actual ending point of the movement. This actual movement is representing by arrow 502. FIG. 5C illustrates the displayed ending point of the truncated head movement for virtual user 500C. This truncated movement is represented by arrow 504. Thus, in order to avoid latency-based display delays, the portion of the motion 506 that is past what is shown by virtual user 500C would not be displayed by the user system. Therefore, the frames displayed to the user would alter the virtual-reality environment according to the movement represented by arrow 504, rather than the movement represented by arrow 502.

While FIGS. 3A-3C, 4A-4C, and 5A-5C depict singular motions (e.g., one type of movement in one plane, in some embodiments, combinations of motions are possible. In these embodiments, an applicable movement threshold may be based on a combination of the movement thresholds of the combined motions.

Figure 6:
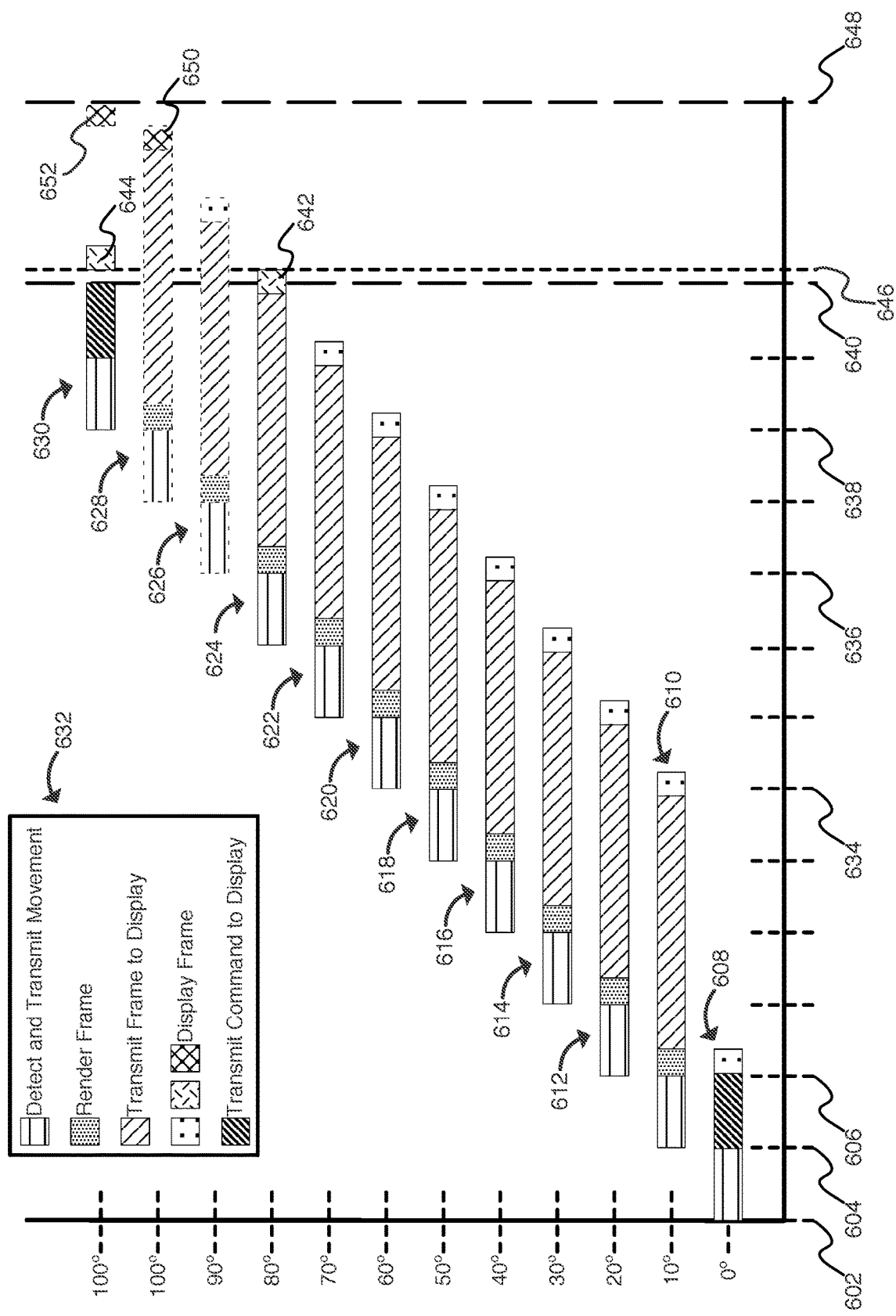
FIG. 6 depicts an example timeline for a set of frames that reflects a movement and an associated immediate stop command in accordance with embodiments of the present disclosure.

To further aid in understanding, FIG. 6 depicts an example timeline for a set of frames that reflects a movement and an associated immediate stop command in accordance with embodiments of the present disclosure. The graph in FIG. 6 is meant to be an abstraction to make the concepts discussed herein more presentable and comprehensible. Thus, no portion of FIG. 6 is intended to be precisely accurate.

In FIG. 6, the X axis graphs the passage of time after a user movement is first detected at time 604. The movement is depicted as a 100° rotation (e.g., turning one's head from left to right), and the progress of the movement is illustrated on the Y axis. Each short axis gridline on the X axis (e.g., the gridlines for times 602, 604, and 606) marks the beginning of a detection of a new portion of the movement. For example, the amount of time between time 604 and 606 may be the polling frequency of a movement sensor on a VR headset worn by a user.

Each of frame bars 608 through 630 represent the timeline by which a series of still and movement frames are created and displayed. The frame bars 608 through 630 are separated into sections that are detailed in legend 632. For example, frame bar 608 corresponds to a point at which the user has not yet started the rotational movement (as evidenced by the fact that the bar is on the 0° level. Thus, at time 602 a user device (e.g., a VR movement sensor) may detect that the user has not moved since the last frame was displayed, and may transmit that determination to a render server. The information may arrive at the render server at time 604. The render server may then create a command to redisplay the last frame and transmit that command to the user system. That command arrives, as illustrated, shortly after time 606. The frame may then be redisplayed on the user device at that point, as shown in frame bar 608. The time between the lack of movement was detected (time 602) and the time at which a frame illustrating that lack of movement is displayed (shortly after time 606) illustrates very low latency-based delay.

Further, frame bar 610 illustrates the timeline of the first frame of the user movement. For example, the user system detects, at time 604, that the user has rotated 10° since the last polling instance (i.e., time 602). This information may then be transmitted to the rendering server between times 604 and 606. The render server may then render the first movement frame once it receives the user-movement data, after which it begins the long process of packaging and transmitting the rendered frame to the user's display. Once this frame arrives at the user display, it can be displayed by the user display at approximately time 634. The delay between the first 10° of the movement was detected at time 604 and the time at which it was finally displayed at time 634 represents the latency-based signal delay associated with rendering movement frames in a cloud environment. This latency-based signal delay is also evident by the time between the ending of frame bar 608 and 610.

However, after the original latency-based delay, frames are returned to and displayed by the user display at the regular polling intervals (i.e., the amount of time between times 602 and 604). Thus, the frame corresponding to bar 612 (i.e., the frame that illustrates the movement from 10° to 20°) can be displayed far sooner after the frame corresponding to bar 610 is displayed, as compared to the amount of time between displaying frame 608 and 610. Further, as can be seen in frame bars 610 and 612, because transmitting a frame is such a long portion of the latency-based delay, a subsequent frame may be completely rendered before the previous frame is even halfway done with the transmitting process. This pattern continues through frame bars 614 though 628 (i.e., the frames that reflect 30° through 100° of the user movement).

However, as the Y axis shows, no movement occurs between frame bars 628 and 630. Thus, the system detects, at time 638, the user system may notify the rendering server that the movement has stopped. The rendering server may then transmit an immediate-stop command to the user system, which the user system receives at time 640. The immediate stop command may contain an instruction to redisplay the current frame. As the frame corresponding to frame bar 624 (i.e., frame 642) is currently being displayed at time 640, the system may repeat that frame after it is able to. This may occur at time 646, which may be the start of a refresh cycle of the user-system display device. This is illustrated by frame 644, which may be identical to frame 642 and, as illustrated, is displayed to the user immediately following frame 642.

By utilizing the rendering system's stop command and truncating the displayed user movement, the latency-based display delay can be reduced to the time between time 638 and 640. By truncating the displayed movement, the frames associated with frame bars 626 and 628 (e.g., the frames that reflect the movement from 80° to 90° and 90° to 100°), even though the frames for those bars were already in transit to the user system before the stop command was created. If, on the other hand, the movement were not truncated, the latency-based delay may, rather than spanning between time 638 and time 646, span between 638 and 648, at which point frame 650 (the frame associated with frame bar 628) would be repeated. This repetition is illustrated by frame 652. In other words, by truncated the displayed user movement with an immediate stop command, the apparent latency-based delay of the displayed movement can be significantly reduced.

Figure 7:
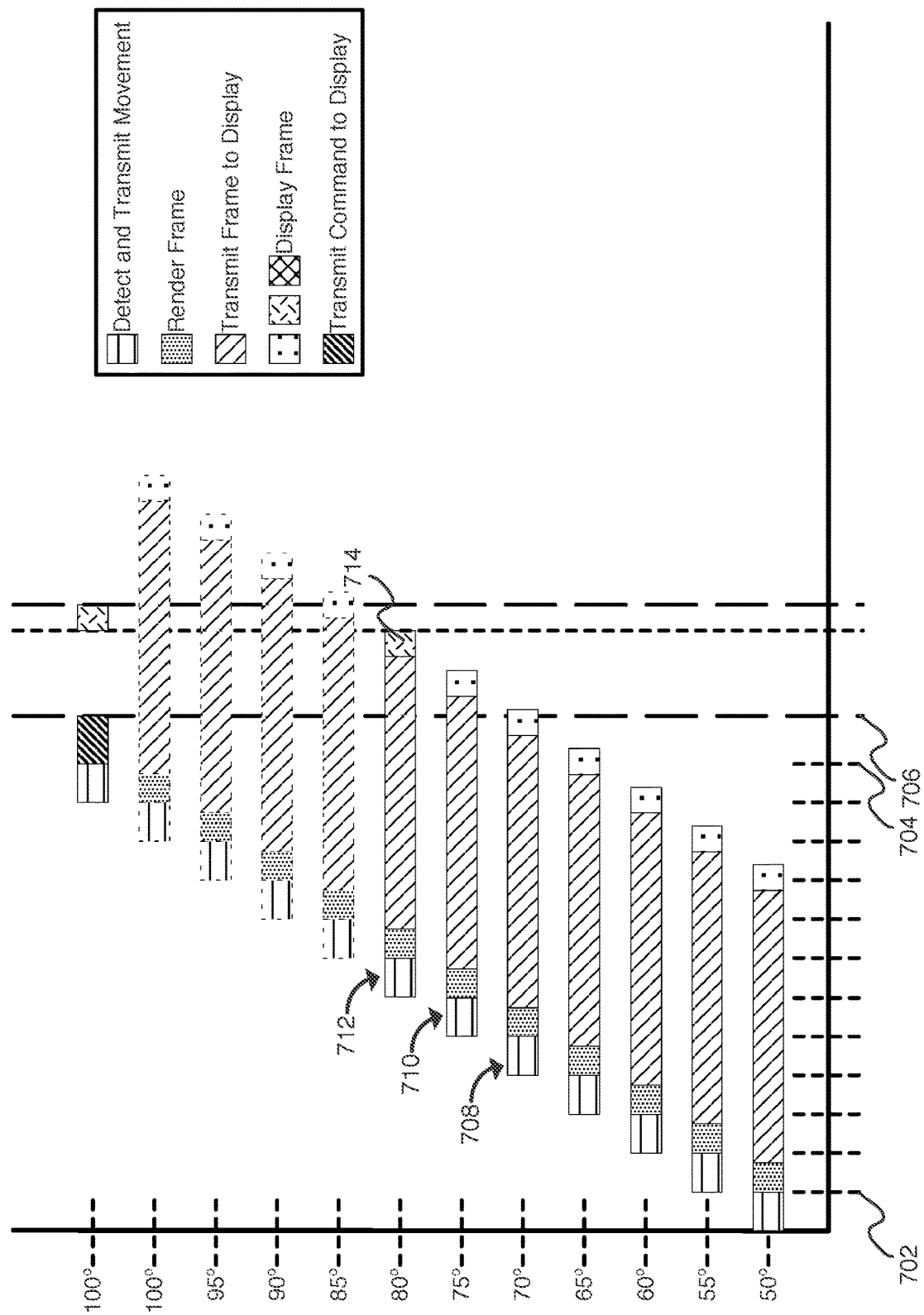
FIG. 7 depicts an example timeline for a set of frames that reflects a movement and an associated delayed stop command in accordance with embodiments of the present disclosure.

Also to further aid in understanding, FIG. 7 depicts an example timeline for a set of frames that reflects a movement and an associated delayed stop command in accordance with embodiments of the present disclosure. The graph in FIG. 7 is meant to be an abstraction to make the concepts discussed herein more presentable and comprehensible. Thus, no portion of FIG. 7 is intended to be precisely accurate.

FIG. 7 differs from FIG. 6 in that the polling frequency at which the user display is able to detect movement is significantly faster. Thus, the short axis gridlines (such as gridline 702) are closer together, and the Y axis separates movements into 5° sections rather than 10° sections. In many other ways, FIG. 7 should be understood to be very similar to FIG. 6.

In FIG. 7, for example, the rendering system receives information suggesting that the user's movement has stopped at time 704, after which it transmits a stop command to the user system. However, the user's system receives the stop command at time 706, during which the frame associated with frame bar 708 (the frame reflecting the 70° movement) is being displayed. However, if a movement threshold were set to 80%, then frames rendered for the 70° and 75° portions would not be over the threshold, and thus are not eligible for truncation. Thus, the stop command transmitted by the rendering server in block 706 may be a delayed stop command, and may inform the user device to display the rendered frames associated with bars 710 and 712 before repeating frame 714. In this embodiment, once frame 714 is displayed, 80% of the movement will have been displayed, qualifying further frames (e.g., the frames reflecting 85° through 100° of movement) may be truncated to mitigate the latency-based delays.

Figure 8:
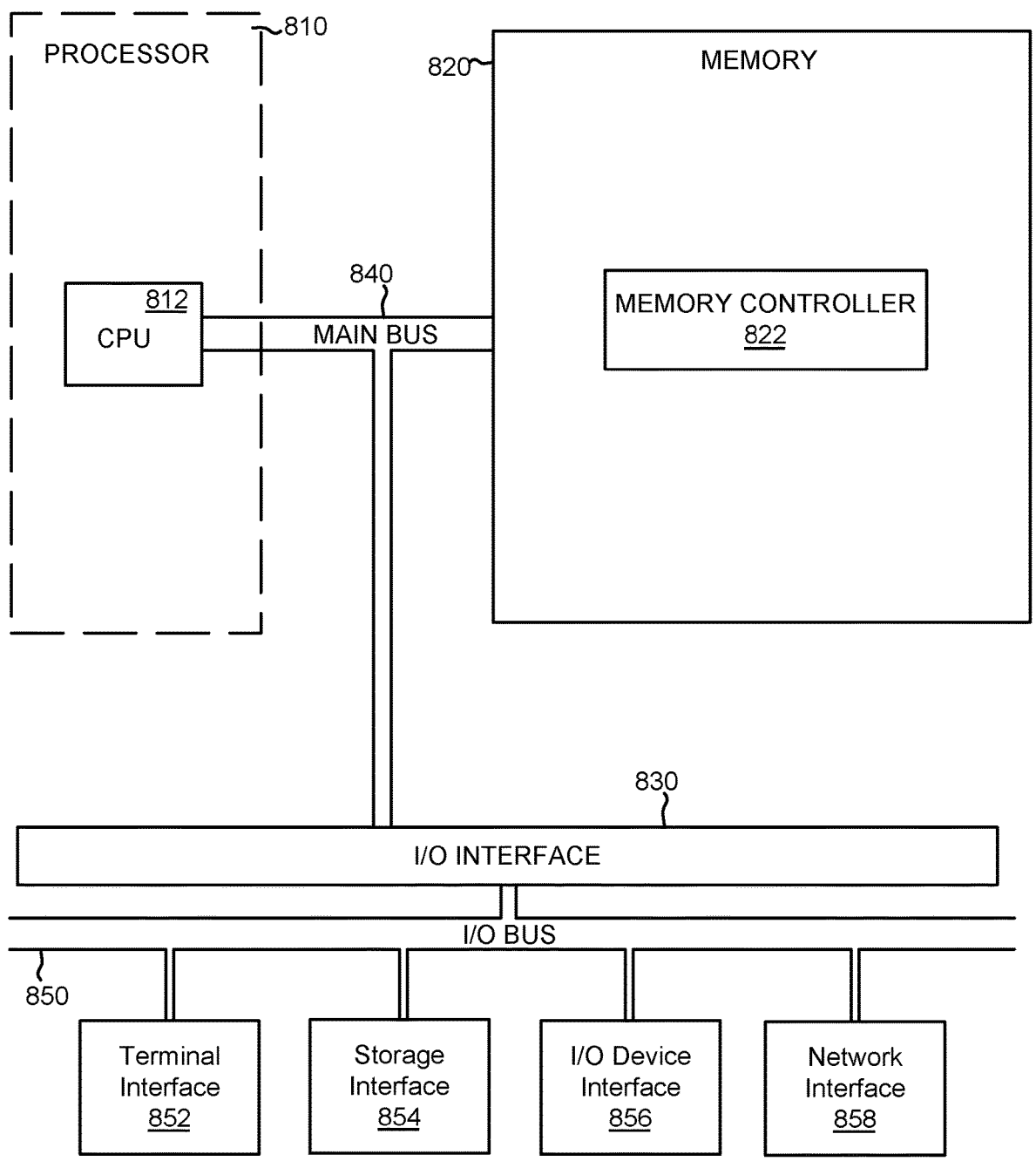
FIG. 8 depicts the representative major components of a computer system that may be used in accordance with embodiments.

FIG. 8 depicts the representative major components of an example Computer System 801 that may be used in accordance with embodiments of the present disclosure. The particular components depicted are presented for the purpose of example only and are not necessarily the only such variations. The Computer System 801 may include a Processor 810, Memory 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may include one or more CPUs 812. The Processor 810 may additionally include one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may include one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may include a Memory Controller 822 and one or more memory modules for temporarily or permanently storing data (not depicted). In some embodiments, the Memory 820 may include a random-access semiconductor memory, storage device, or storage medium (either volatile or non-volatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may include an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may include the Terminal Interface 852, the Storage Interface 854, the I/O Device Interface 856, and the Network Interface 858. In some embodiments, the various interfaces may include a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
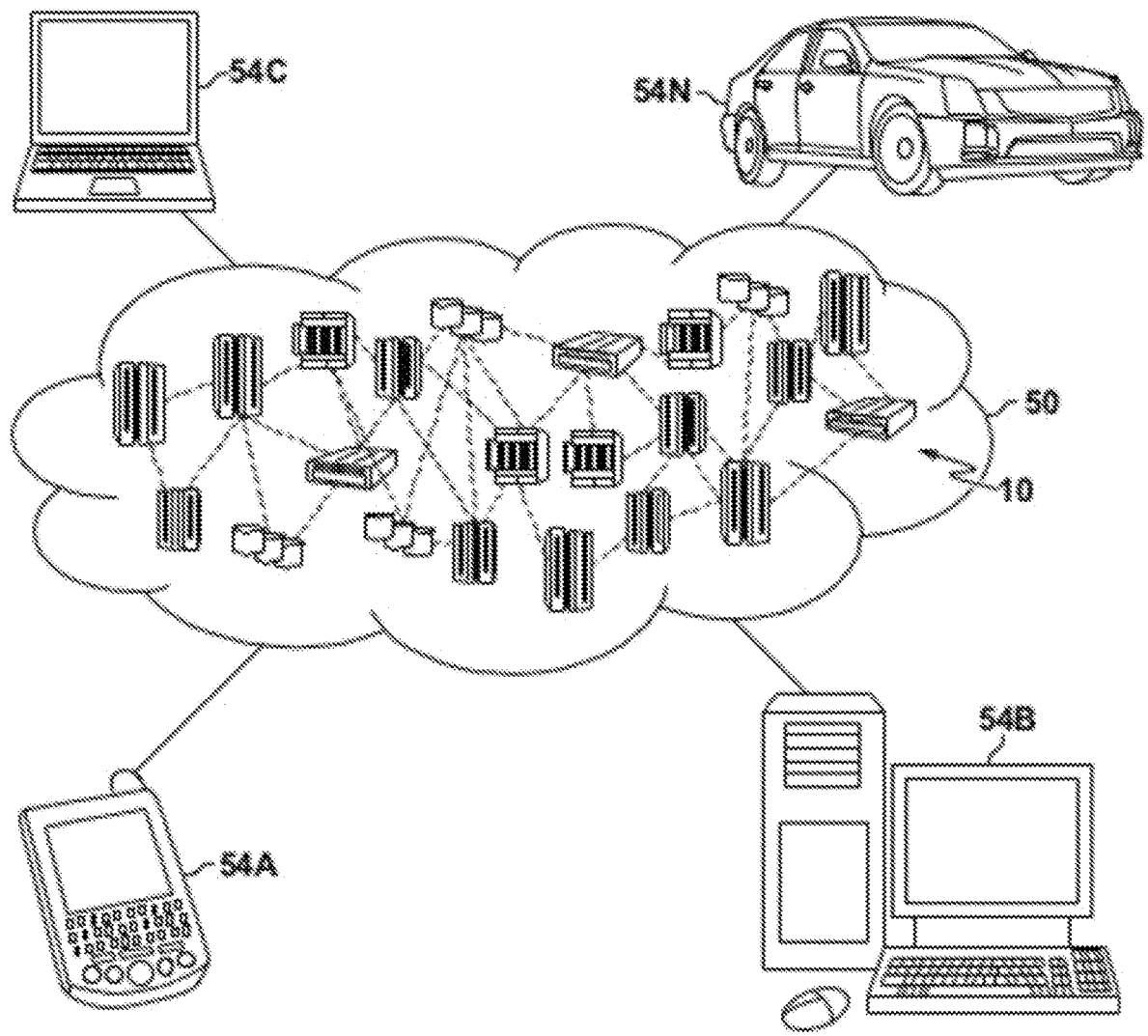
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
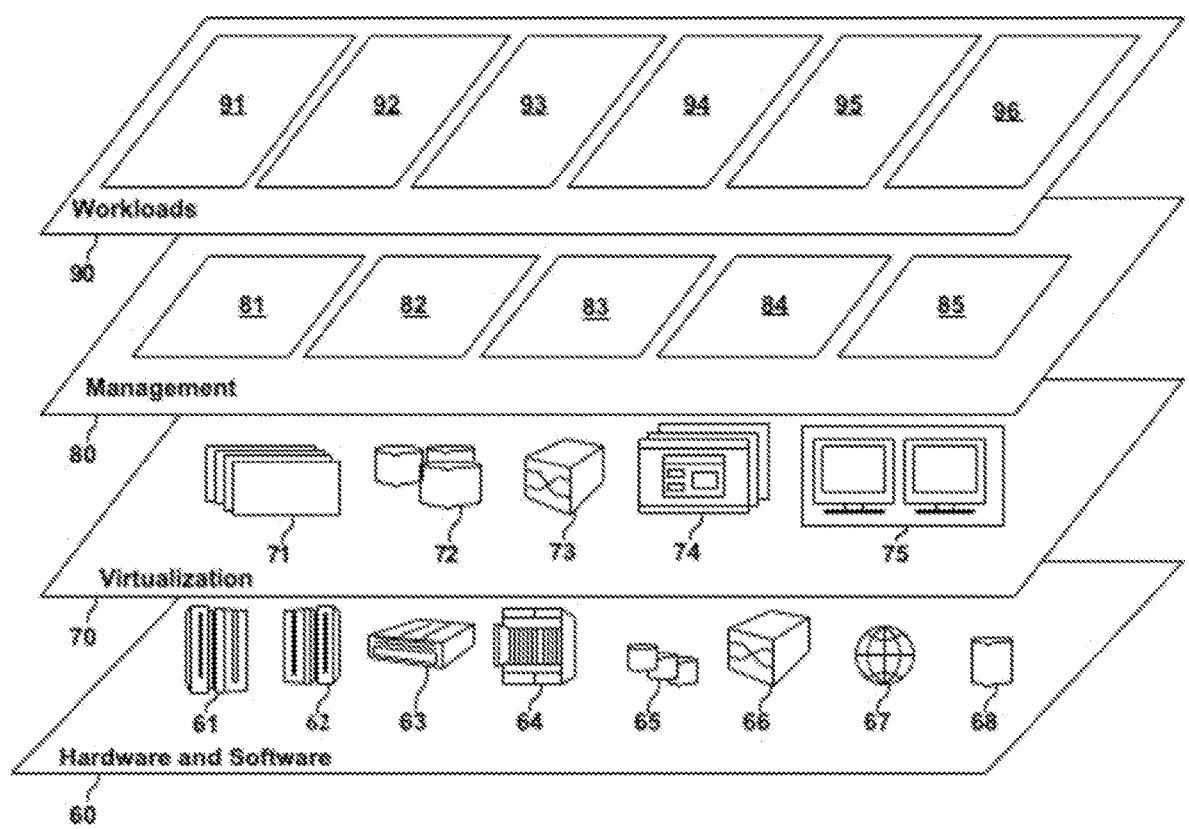
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remote graphics processing 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving, from a display, a movement notification, wherein the movement notification corresponds to a movement;
    rendering, by a graphical processing unit, a set of movement frames that reflect the movement;
    transmitting, to the display, the set of movement frames;
    receiving, from the display, a notification that the movement has ceased; and
    transmitting, to the display, a stop command, wherein the stop command instructs the display to not display a first subset of frames in the set of movement frames, wherein the first subset of frames reflects the end of the movement.

2. The method of claim 1, wherein the stop command comprises an instruction to redisplay the most recently-displayed frame.

3. The method of claim 1, wherein the method further comprises:
    obtaining a movement threshold; and
    determining that the first subset of frames reflects a first portion of the movement that is beyond the movement threshold, wherein the stop command is based on the determining.

4. The method of claim 2, wherein the method further comprises:
    identifying a second subset of frames that reflects a second portion of the movement that is not beyond the movement threshold;
    wherein the stop command also comprises instructions to display the second subset of frames and to redisplay the last frame in the set of movement frames.

5. The method of claim 1, wherein the stop command is an immediate stop command.

6. The method of claim 1, wherein the stop command is a delayed stop command.

7. A method comprising:
    detecting a movement command, wherein the movement command corresponds to a movement;
    transmitting the movement command to a server;

receiving, from the server, a first set of movement frames that reflect a first portion of the movement;

receiving, from the server, a stop command;

receiving, from the server, a second set of movement frames that reflect a second portion of the movement;

displaying the first set of movement frames;

redisplaying, after displaying the first set of movement frames, a frame from the first set of movement frames; and discarding without displaying, based on the stop command, the second set of movement frames.

8. The method of claim 7, wherein the method further comprises:

identifying a movement threshold; and determining that the second portion of the movement is beyond the movement threshold;

wherein the discarding is also based on the determining.

9. The method of claim 8, wherein the method further comprises:

identifying a subset of frames, wherein the subset of frames comprises each frame that reflects the movement and that the display has already displayed;

detecting, in response to the stop command, that the subset of frames does not reach the movement threshold; and delaying the displaying the still frame in response to the detecting.

10. The method of claim 8, wherein the movement threshold is selected by a user.

11. The method of claim 8, wherein the movement threshold is based on a type of the movement.

12. The method of claim 8, wherein the movement threshold is based on the speed of the movement.

13. The method of claim 8, wherein the movement threshold is based on the software environment.

14. A system comprising:

a processor; and a memory in communication with the processor, the memory containing program instructions that, when executed by the processor, are configured to cause the processor to perform a method, the method comprising:

receiving, from a display, a movement notification, wherein the movement notification corresponds to a movement;

rendering, by a graphical processing unit, a set of movement frames that reflect the movement;

transmitting, to the display, the set of movement frames;

receiving, from the display, a notification that the movement has ceased; and transmitting, to the display, a stop command, wherein the stop command instructs the display to not display a first subset of frames in the set of movement frames, wherein the first subset of frames reflects the end of the movement.

15. The system of claim 14, wherein the stop command comprises an instruction to redisplay the most recently-displayed frame.

16. The system of claim 14, wherein the method further comprises:

obtaining a movement threshold; and determining that the first subset of frames reflects a first portion of the movement that is beyond the movement threshold, wherein the stop command is based on the determining.

17. The system of claim 16, wherein the method further comprises:

identifying a second subset of frames that reflects a second portion of the movement that is not beyond the movement threshold;

wherein the stop command also comprises instructions to display the second subset of frames and to redisplay the last frame in the set of movement frames.

18. The system of claim 14, wherein the stop command is an immediate stop command.

19. The system of claim 14, wherein the stop command is a delayed stop command.

20. The system of claim 16, wherein the movement threshold is based on a type of the movement.

* * * * *